Feb. 17, 1959  E. WILDHABER  2,873,619
CAM-TYPE DIFFERENTIAL
Filed Nov. 9, 1956  2 Sheets-Sheet 1
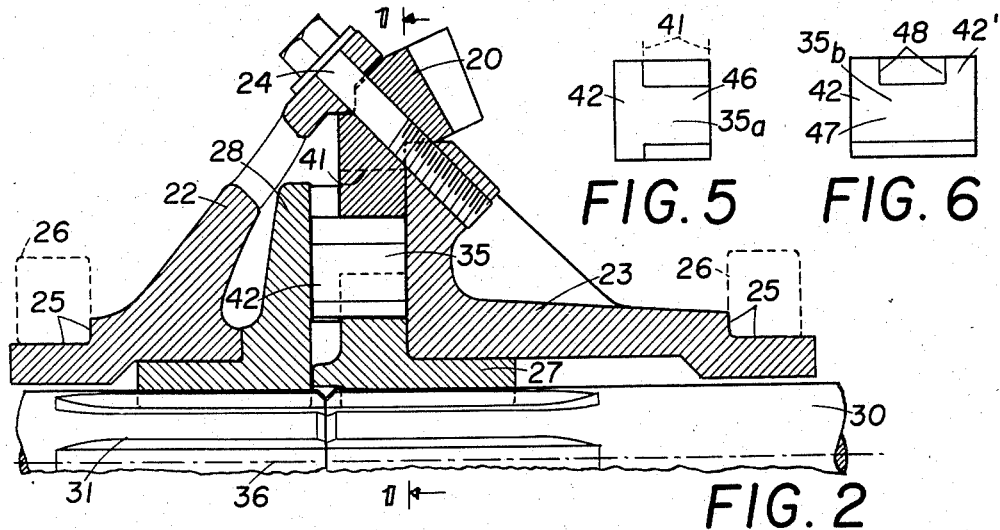
FIG. 5  FIG. 6
FIG. 2
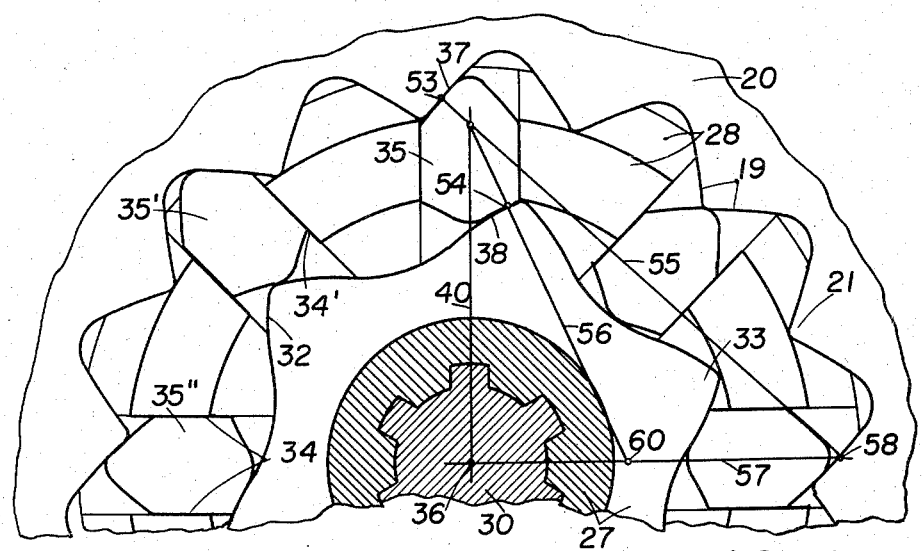
FIG. 1
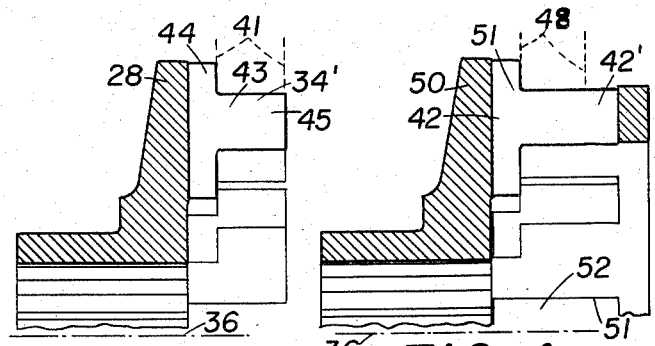
FIG. 3  FIG. 4
INVENTOR:
Ernest Wildhaber

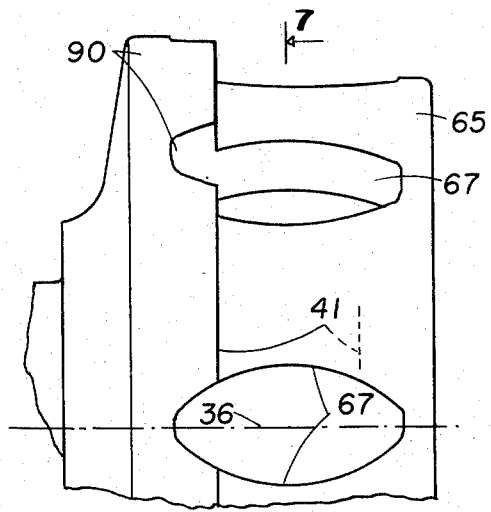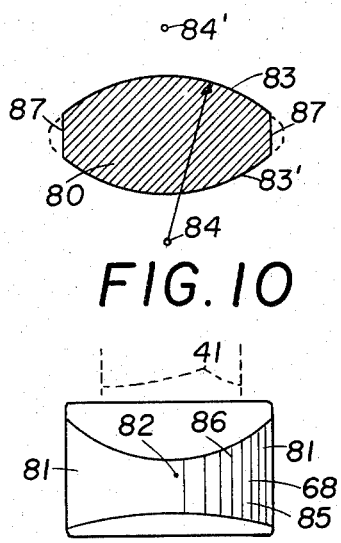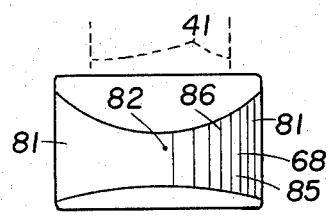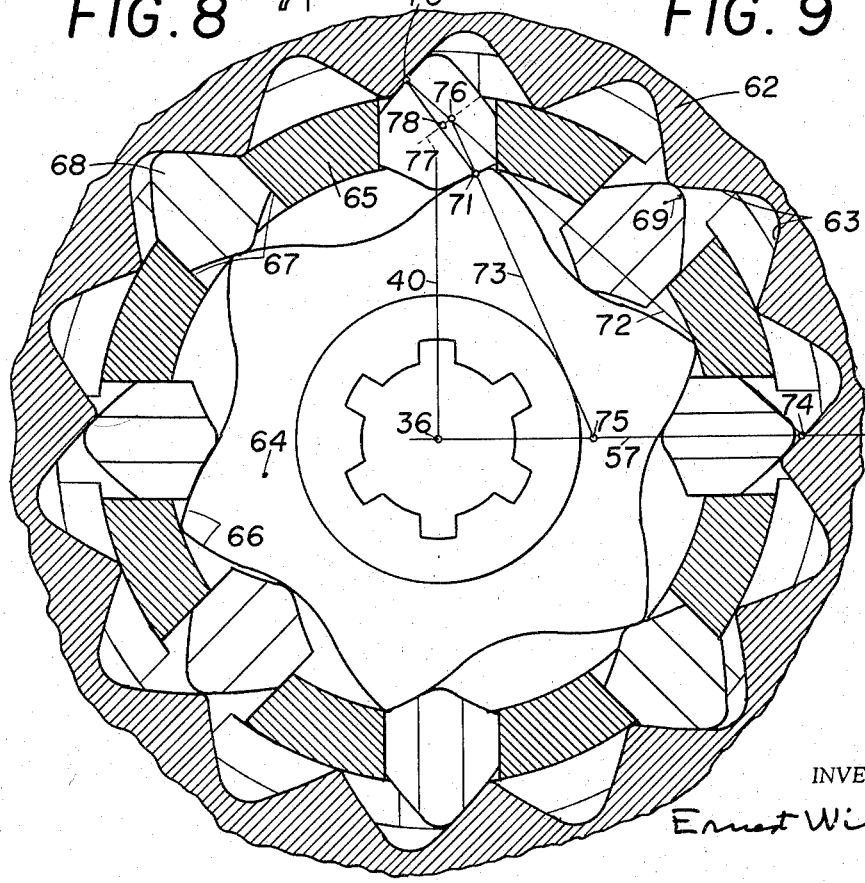

United States Patent Office 2,873,619
Patented Feb. 17, 1959

2,873,619
CAM-TYPE DIFFERENTIAL
Ernest Wildhaber, Brighton, N. Y.
Application November 9, 1956, Serial No. 621,220
9 Claims. (Cl. 74—650)

The present invention relates to gearless differentials or cam-type differentials, primarily for use on automotive vehicles.

Such differentials comprise three coaxial and relatively rotatable members, of which one is a cage member containing sliding blocks and the two other members are cam members engaged by said sliding blocks.

One object of the present invention is to achieve improved guidance of the sliding blocks in the cage member, either by a modified design of the cage member, or of the sliding blocks, or of both.

A further object is to devise a design with improved guidance of the sliding blocks, in which the sliding blocks are self-aligning and are lens-shaped in cross section.

A chief object is to devise an improved differential of the type disclosed in my application "Gearless differential," filed October 12, 1953, Serial No. 385,573, now Patent No. 2,790,334, granted April 30, 1957. An improved design of the sliding blocks and cam shapes shall be accomplished, that is made possible by the improved guidance of the sliding blocks.

Other objects will appear in the course of the specification and in the recital of the appended claims. These objects may be attained singly or in any combination.

In the drawings:

Fig. 1 is a fragmentary axial view and partly a cross section of a differential constructed according to the present invention, the section being taken along lines 1—1 of Fig. 2, looking in the direction of the arrows.

Fig. 2 is an axial section at a reduced scale of the differential of Fig. 1, showing one half of the differential.

Fig. 3 is a fragmentary axial section of the cage member shown in Figures 1 and 2.

Fig. 4 is a fragmentary axial section of a slightly modified form of cage member.

Figures 5 and 6 are side views of modified forms of sliding blocks, the form of Fig. 6 being adapted to the cage member of Fig. 4.

Fig. 7 is an axial view and cross section similar to Fig. 1, taken along lines 7—7 of Fig. 8 and illustrating a modified embodiment of the invention.

Fig. 8 is a fragmentary side view of the cage member shown in Fig. 7.

Figures 9 and 10 are a side view and a cross section respectively of a sliding block used in the embodiment of Fig. 7.

In Figures 1 to 4 numeral 20 denotes the drive gear of for instance a rear axle, here shown as a tapered ring gear. It contains an internal cam track 19 with a plurality of tooth-like projections 21, which convey the appearance of an internal gear. End parts 22, 23 are rigidly secured to gear 20, as by bolts 24 threading into part 23. The end parts 22, 23 contain seats 25 for antifriction bearings 26 indicated diagrammatically. Thus the unit or member comprising drive gear 20 and end parts 22, 23 is rotatably mounted in an axially fixed position in the axle.

In addition to this drive member the differential comprises two further members 27, 28 coaxial therewith. All three coaxial members are rotatable relatively to each other. The members 27, 28 are the driven members of the differential, and are adapted to transmit torque to the two splined axle shafts 30, 31 respectively. Member 27 is a cam member and contains an external cam track 32 having tooth-like projections 33, fewer in number than those of the internal cam track 19. The cage member 28 contains radially directed ways 34 engaged by sliding parts or sliding blocks 35. These are movable between the cam members 20, 27 towards and away from the axis 36 of the differential and of the three coaxial members, in engagement with said cam tracks 19, 32.

This arrangement, in which the member with the internal cam track (19) is the driver, has been completely described in the above-named application. Here the sliding blocks 35 contact the cam tracks in two diagonally opposite regions 37, 38, on opposite sides of the center line 40 of the blocks. Line 40 is also the direction of the path of the considered block 35 in the cage member 28. With this arrangement it is found usually advantageous to keep the sliding blocks short in the direction of their motion, as short as compatible with good control of the motion.

Improved control of the motion of the relatively short blocks 35 is attained according to the present invention by providing blocks that are wider, in the direction of axis 36, than the face width (41) of the came tracks. The blocks 35 reach past the cam tracks at 42, Fig. 2. The ways 34 extend along the whole axial width of the sliding blocks, and are longer at 42, where they are out of reach of the cams. The side surfaces 34' of the ways 34 are parallel planes, as are also the side surfaces of the blocks that contact therewith. Each side surface 34' is bounded by lines that form a T-shape, as best seen at 43 in Fig. 3. The cross bar 44 of the T-shape extends along a plane perpendicular to the axis 36 of the differential. The stem 45 of the T-shape extends parallel to said axis.

Improved motion control is achieved even with blocks 35 that have the same cross section all along their width. While for instance blocks 35', 35" (Fig. 1) reach outside of the cage (28) in the region of the cam tracks, they are still completely inside the ways on the side, at 42 (Fig. 2).

The length of the guiding contact between the ways and blocks can be further increased by a block design as shown in Fig. 5. Sliding block 35a fits the same cage member 28 as the blocks 35. But its plane sides 46 are extended adjacent one end, at 42, where they are out of reach of the cam tracks. Thus the plane side surfaces 46 form a T-shape. At the end portion 42 the sliding blocks 35a engage their guide ways in full length.

While the sliding blocks 35a have extended guidance on one end (42) only, the sliding blocks 35b shown in Fig. 6 have extended guidance on both ends 42, 42'. Their plane sides 47 are extended at both ends, outside of the reach 48 of the cam tracks. They are bounded by lines that give the sides 47 the appearance of a U-shape. Blocks 35b require a modified cage member, for instance as shown at 50 in Fig. 4. The guide ways 51 extend axially beyond the reach 48 of the cam tracks at both ends 42, 42'. They form rectangular openings 52 in the cage member 50.

Fig. 1 applies to all sliding-block designs so far discussed, as they all have the same working portions within the reach or face width of the cam tracks. The reciprocation cycle of the sliding blocks comprises a working period for each of the two sides and reversal periods. In the working period the contact between the cam profiles and block profiles is very intimate, these profiles having only a slight difference in curvature not noticeable in the drawing. Nevertheless they have points of contact at any one instant. Points of contact 53, 54 are indicated on a block 35 that has a mean radial position. The profile normals 55, 56 at points 53, 54 intersect base line 57 at points 58, 60, whose distances 58—36, 60—36 from axis 36 are proportional to the number of teeth in the cam tracks 19, 32 respectively. Base line 57 is perpendicular to the path 40 of the considered sliding block 35.

The distances 58—36, 60—36 are the radii at which the sliding velocity of block 35 in its way equals the peripheral velocity of the two cam members 20, 27 respectively, relatively to the cage member 28. In other words 58 and 60 are the instantaneous axes of relative motion.

High intimacy of contact is achieved during the working period with a sliding-block motion that is non-uniform upon uniform rotation of the cam members 20, 27 relatively to the cage member, the sliding block velocity increasing with increasing distance of the sliding block from the axis 36 of the differential. The instantaneous axes (58, 60) then also move further away from axis 36.

These profile shapes have been completely described in my aforesaid application, to which reference is made.

In the embodiment of Figures 7 to 10 the member (62) with the internal cam track (63) is again the driver. Cam member 64 with the external cam track 66 and cage member 65 are the driven members. The internal cam track 63 is identical with track 19 of Fig. 1. The cage member 65 contains radial ways or openings 67 in which sliding parts or sliding blocks 68 are movable between the cam members 62 and 64 in engagement with the cam tracks 63 and 66.

The blocks 68 are still shorter, in the direction of their travel, than the blocks 35 of Fig. 1. Contact points 70, 71 between a sliding block 68 and the cam profiles are shown for a mean position of the block. 72, 73 denote the profile normals at the points 70, 71 respectively. They intersect base line 57 at points 74, 75 of the instantaneous axes of relative motion, as described with Fig. 1.

Novel proportions are used in this design, insofar as the length of the sliding blocks and the profiles are so selected that the normals 72, 73 intersect at a point 76 that has equal distances 70—76, 71—76 from both contact points 70, 71 in the mean position of the sliding block. Also point 76 lies on the same side of the radial center line 40 of the sliding path and block as the contact point 71 of the block with the profile of the external cam track 66.

It should also be noted that the block 68 has a larger end radius 69 at its outer end than the tooth ends of cam track 63.

Friction causes the forces exerted on the block to be inclined to the normals 72, 73. The inclination depends on the friction coefficient, which is a quantity which varies somewhat with the sliding velocity of the block, and is approximately equal at both points of contact 70, 71. Accordingly the forces at points 70, 71 are about equally inclined from the respective normals 72, 73. The side to which they are inclined from the normal depends on the direction of the sliding motion of the block. When block 68 moves outwardly, and the coefficient of friction is large enough to result in an inclination angle 76—70—71 of the driving force at point 70 to its normal 72, then the same coefficient of friction produces an equal inclination angle 76—71—70 at point 71 to normal 73, and the two forces exerted at 70 and 71 on block 68 coincide. This because the distances 70—76 and 71—76 are equal. In this case then the force is directly transmitted from the driver 20 to the external cam member 64 through the block 68, without reaction on the ways 67. No torque is then transmitted to the cage member 65, all the torque being transmitted to the external cam member 64. An because the opposite forces act along the same line and are not offset from each other, no tilting moment is exerted on the block. The block is easily guided.

With different friction coefficients the force lines passing through points 70, 71 are inclined to each other. With equal coefficients of friction at both points 70, 71, they remain equally inclined to the normals 72, 73 respectively. They intersect midway between the points 70, 71 at a point of dotted line 77. This line passes through point 76 and is perpendicular to line 70—71. One such point of intersection is indicated at 78.

As the forces exerted on block 68 hold balance, all these forces intersect at the same point. That is the force representing the reaction from the guide way passes through the above said intersection point on line 77. This point is well within the length of the guide way, so that the sliding block is directly supported. No tipping moment is exerted on it.

But in spite of this favorable condition more guiding length is desirable than that of the central sectional plane, the drawing plane of Fig. 7.

According to the present invention a susbtantially increased guiding length is attained with sliding blocks 68 of lens-shaped cross section 80, see Figures 9 and 10. The guiding length is substantially longer at the ends 81 than in the middle portion 82. The cross section has circular arcuate profiles 83, 83' centered at points 84, 84' respectively. These points are spaced apart and lie outside of the cross-sectional area 80. The side surfaces 85 containing said profiles are cylindrical surfaces whose straight-line elements 86 extend in the direction of the sliding motion of the block 68. The blocks may have flat ends 87, and are preferably wider than the face width or reach 41 of the cam tracks.

The guide ways 67 provided on the cage member 65 are lens-shaped openings or holes matching the blocks with a sliding fit. If desired, an enlarged diameter may be used on the cage member at the end 90 of the guide ways 67, to further increase the length of the guide ways at that end.

As compared with known blocks whose cross section is a single circle, the lens-shaped block gives better guidance at the ends (81), because its side surfaces 85 are less inclined to the direction of the axis 36 of the differential than on the circular block. Also axially wider blocks can be used at a given thickness.

The lens-shaped block also retains a valuable property of the circular block, namely self alignment. The circular block with cylindrical outside surface can turn slightly on its axis to adjust the direction of its working surfaces to the exact direction of the cam teeth. In this way slight inaccuracies of manufacture and deflections under load are counteracted. The lens-shaped block aligns itself similarly about the center (84) of the circular profile (83) that transmits load to the cage member. To permit such minute alignment a somewhat loose running fit is required between the blocks 68 and the openings 67 that guide it.

The smoothness of operation may be further increased with the use of materials in which the coefficients of static and of sliding friction differ only slightly. If desired, one of the contacting parts of two cooperating parts may be plated or faced with a suitable material to this effect. This may be done on either the cam tracks or the sliding blocks.

Obvious known changes are made in the design when the differential is to be used as an inter-axle differential, to transmit torque to a plurality of pairs of wheels. But the differential still comprises three coaxial and relatively rotatable members, such as cam members 62, 64 and cage member 65, of which one is the driver and two are the driven members.

Also while I have described the invention particularly as applied to the type of differential disclosed in the above-named patent application, it is more broadly applicable, since its application does not depend on which of the three coaxial members is the driver.

It will be understood that the invention is capable of further modification, and this application is intended to cover any variations, uses, or adaptations of the invention following, in general, the principles of the invention and including such departures from the present disclosure as come within known or customary practice in the art to which the invention pertains and as may be applied to the essential features herein-before set forth and as fall within the scope of the invention or the limits of the appended claims.

I claim:

1. A cam-type differential comprising three coaxial and relatively rotatable members, namely a cage member and two cam members, said cam members having an internal and an external cam track respectively, one of said three members being the driver and the two other members being driven members adapted to transmit torque, guide ways provided on said cage member, a plurality of sliding blocks movable in said guide ways towards and away from the axis of said members in engagement with said cam tracks, said sliding blocks having an axial width larger than the axial face width of said cam tracks, and each of said guide ways having a portion aligned axially with said cam tracks and a portion extending axially beyond the associated cam tracks, said extending portion being longer in the direction of movement of said blocks than the portion of the guide way which is aligned axially with said associated cam tracks.

2. A cam-type differential comprising three coaxial and relatively rotatable members, namely a cage member and two cam members, said cam members having an internal and an external cam track respectively, the cam member with the internal cam track being the driver and the other two of said three members being driven members adapted to transmit torque, guide ways provided on said cage member, a plurality of sliding blocks movable in said guide ways towards and away from the axis of said members in engagement with said cam tracks, said sliding blocks having an axial width larger than the axial face width of said cam tracks, and each of said guide ways having a portion aligned axially with said cam tracks and a portion extending axially beyond the associated cam tracks, said extending portion being longer in the direction of movement of said blocks than the portion of the guide way which is aligned axially with said associated cam tracks.

3. A cam-type differential according to claim 2, in which the longer portion of each of said guide ways lies at one side only of the guideway.

4. A cam type differential according to claim 3, in which the guide ways provided on the cage member have opposite side surfaces, each of which is of T-shape, the portion representing the transverse bar of the T-shape extending in the direction of the relative motion of its sliding block and lying axially beyond said cam tracks, out of reach of said cam tracks.

5. A cam-type differential according to claim 4, in which said opposite side surfaces are parallel planes.

6. A cam-type differential according to claim 1, in which said sliding blocks are of double convex lens shape in cross section, each block being thickest at its middle and thinner at both ends.

7. A cam-type differential according to claim 6, in which the sliding blocks project axially beyond said cam tracks on both sides thereof.

8. A cam-type differential according to claim 2, in which each sliding block is movable along a center line radial of the axis of the differential, and in which in the middle position of a sliding block the working profiles of said block contact the cam profiles at diagonally opposite points located on opposite sides of said center line, the profile normals at said points intersecting each other at approximately the same distance from both of said opposite points.

9. A cam-type differential according to claim 2, in which each sliding block is movable along a center line radial of the axis of the differential, and in which in the middle position of a sliding block the working profiles of said block contact the cam profiles at diagonally opposite points located on opposite sides of said center line, the profile normals at said points intersecting each other at a point located on the same side of said center line on which lies also the contact point of the block with the profile of the external cam track.

References Cited in the file of this patent

UNITED STATES PATENTS

| | | |
|---|---|---|
| 1,689,285 | Knab | Oct. 30, 1928 |
| 1,836,684 | Robbins | Dec. 15, 1941 |
| 2,560,779 | Robbins | July 17, 1951 |

FOREIGN PATENTS

| | | |
|---|---|---|
| 40,256 | France | Feb. 12, 1932 |
| | (Addition to No. 618,110) | |
| 1,114,933 | France | Dec. 26, 1935 |
| 180,566 | Switzerland | Jan. 16, 1936 |